United States Patent
Tenenboym et al.

(10) Patent No.: US 10,078,836 B2
(45) Date of Patent: Sep. 18, 2018

(54) AUTHORIZING ACCESS BY A THIRD PARTY TO A SERVICE FROM A SERVICE PROVIDER

(71) Applicant: Adobe Systems Incorporated, San Jose, CA (US)

(72) Inventors: Isak Tenenboym, San Jose, CA (US); Marc Thomas Kaufman, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/132,284

(22) Filed: Apr. 19, 2016

(65) Prior Publication Data

US 2016/0232519 A1    Aug. 11, 2016

Related U.S. Application Data

(63) Continuation of application No. 13/900,691, filed on May 23, 2013, now Pat. No. 9,344,424.

(51) Int. Cl.

| G06F 7/04 | (2006.01) |
|---|---|
| G06Q 20/36 | (2012.01) |
| H04L 29/06 | (2006.01) |
| G06Q 20/38 | (2012.01) |
| G06Q 20/40 | (2012.01) |

(52) U.S. Cl.
CPC ... *G06Q 20/3674* (2013.01); *G06Q 20/38215* (2013.01); *G06Q 20/401* (2013.01); *H04L 63/0823* (2013.01); *G06Q 2220/00* (2013.01)

(58) Field of Classification Search
CPC .................................................. G06Q 20/3674
USPC ............................................................ 726/7
See application file for complete search history.

(56) References Cited

U.S. PATENT DOCUMENTS

| 2006/0117382 A1* | 6/2006 | Karabulut | H04L 63/0823 726/10 |
|---|---|---|---|
| 2008/0028228 A1* | 1/2008 | Mardikar | H04L 63/08 713/184 |
| 2008/0141347 A1* | 6/2008 | Kostiainen | H04L 9/32 726/4 |
| 2008/0320560 A1* | 12/2008 | Casey | H04L 63/10 726/3 |

(Continued)

*Primary Examiner* — Peter C Shaw
(74) *Attorney, Agent, or Firm* — Kilpatrick Townsend & Stockton LLP

(57) ABSTRACT

Systems and methods are provided for authorizing third-party access to a specific service from a service provider. In an example embodiment, a server system identifies a shared service from multiple services provided by the server system. The shared service is specified by an authorizing entity. The server system provides a credential associated with the shared service and the authorizing entity. The server system receives a request to access the shared service from a requesting entity that is separate from the authorizing entity. The server system verifies that the request includes the credential and that the credential is associated with the shared service and the authorizing entity. The server system provides access to the shared service to the requesting entity based on verifying that the request includes the credential. The requesting entity is restricted to accessing the shared service identified by the credential as authorized by the authorizing entity.

18 Claims, 4 Drawing Sheets

(56) References Cited

U.S. PATENT DOCUMENTS

| | | | |
|---|---|---|---|
| 2011/0288968 A1* | 11/2011 | King | G06Q 10/06 |
| | | | 705/30 |
| 2012/0304306 A1* | 11/2012 | Chamarty | G06F 21/6209 |
| | | | 726/28 |
| 2013/0246312 A1* | 9/2013 | Lee | G06F 17/30554 |
| | | | 705/400 |

* cited by examiner

AUTHORIZING ACCESS BY A THIRD PARTY TO A SERVICE FROM A SERVICE PROVIDER

CROSS-REFERENCE TO RELATED APPLICATIONS

This application is a continuation of, and claims priority to, U.S. patent application Ser. No. 13/900,691, filed May 23, 2013 and titled "AUTHORIZING ACCESS BY A THIRD PARTY TO A SERVICE FROM A SERVICE PROVIDER," now allowed, the contents of which are hereby incorporated by reference.

TECHNICAL FIELD

This disclosure relates generally to computer-implemented methods and systems and more particularly relates to authorizing access by a third party to a specific shared service from a service provider.

BACKGROUND

Online services provide electronic content and/or electronic services to subscribers over the Internet and/or other data networks. For example, online services may allow an individual to access online stores, financial services, banking services, legal services, and the like over the Internet. Online services may limit access to individuals or entities who have subscribed to the online service. Alternatively, online services may automate certain processes, such as billing and payment for online content and online services, by allowing only subscribers to store billing information for use in future transactions. Online services may thus provide greater convenience to subscribers than non-subscribers.

In some cases, a subscriber to an online service may wish to provide the online service to a third party. Some solutions for providing access to an online service to a non-subscribing third party involve requiring the third party recipient to subscribe to the service. Such solutions may be cumbersome or otherwise undesirable in cases where the third party may only require use of the online service for a single transaction, such as executing an electronic agreement. Other solutions for providing access to an online service to a non-subscribing third party involve providing a gift card or other token to the non-subscribing third party. The non-subscribing third party may use the gift card or other token for a limited amount of time, but may be otherwise unrestricted in the use of the online service. Such solutions may be undesirable in cases where the subscribing party prefers to restrict the use of the online service by the third party to specific types of transactions available via the online service without requiring the third party to subscribe to the service.

Accordingly, it is desirable to provide systems and methods that allow a subscriber of an online service or other authorizing party to permit a non-subscribing third party to securely initiate a specific online transaction.

SUMMARY

In an example embodiment, a method is executed by a processor to allow an authorizing party to authorize access by a third party to a specific service from a service provider. The embodiment involves identifying a shared service from multiple services provided by a server system. The shared service is specified by an authorizing entity. The embodiment also involves associating a credential with the shared service and the authorizing entity. The embodiment also involves receiving a request from a requesting entity to access the shared service. The requesting entity is separate from the authorizing entity. The embodiment also involves verifying that the request includes the credential and that the credential is associated with the shared service and the authorizing entity. The embodiment also involves providing access to the shared service to the requesting entity based on verifying that the request includes the credential. The requesting entity is restricted to accessing the shared service identified by the credential as authorized by the authorizing entity.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
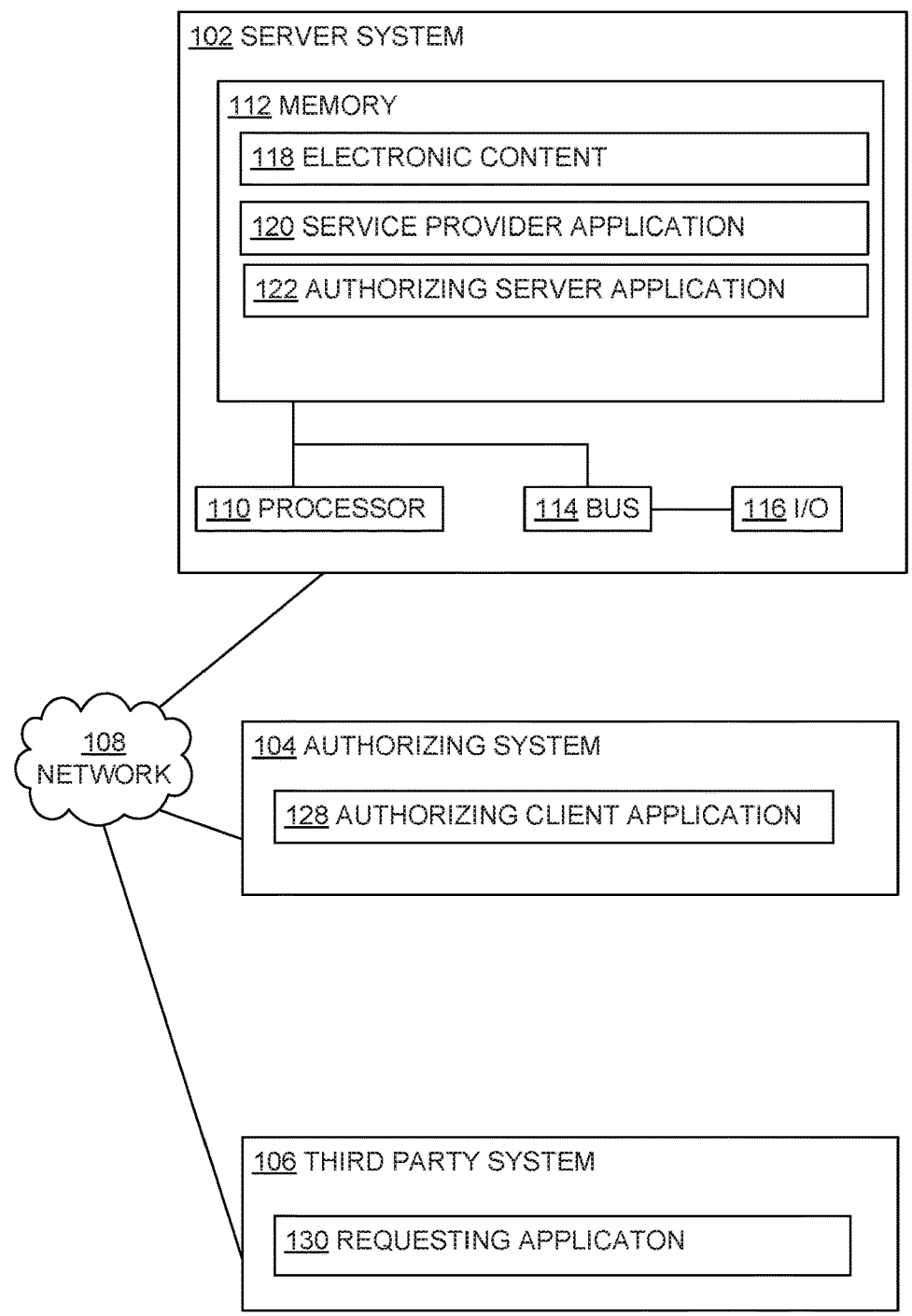
FIG. 1 is a block diagram depicting example computing systems for implementing certain embodiments.

Computer-implemented systems and methods are disclosed for allowing an authorizing party to authorize access by a third party to a specific service from a service provider. A request for a specific online service received from a third-party requestor who lacks a pre-existing account or other previous association with a service provider can be automatically validated based on an authorizing entity having paid for and/or otherwise authorizing access to the specific service. The authorizing party being able to authorize access by a third party to the specific service can obviate the need for a third party-requestor to have access to the authorizing party's subscriber account in order to access an online service.

The following non-limiting example is provided to help introduce the general subject matter of certain embodiments. An online signing service may allow subscribers to digitally sign or otherwise execute electronic documents. A subscribing entity or other authorizing entity may desire that non-subscribing third parties may access the service. For example, an authorizing entity may be a bank that subscribes to the online signing service. The bank may desire that non-subscribing third parties, such as customers of the bank, be permitted to digitally sign mortgage applications and transmit the mortgage applications to the bank via the online signing service. The bank may be charged for each digital signature service by a customer, and therefore may prefer that the use of the online signing service by customers be limited to signing mortgage application forms and no other forms. The bank may also prefer that the use of the online signing service be restricted to one mortgage application form per customer. In order to allow the use of the online signing service under the circumstances preferred by the bank, the bank can register the mortgage application form with the online signing service. Registering the mortgage application form can include providing the mortgage application form to the online signing service. The online signing service can associate a credential with the bank and the mortgage application form. The credential can be used to certify that a customer providing the credential is authorized to use the online signing service. The bank may not identify specific customers that are authorized to use the online signing service.

Subsequently, a customer who wishes to apply for a mortgage may download the mortgage application form from the bank's website. The customer may also obtain the credential from the bank's website. The customer may transmit the completed mortgage application form to the online signing service with a request to execute the mortgage application form. The online signing service can verify the association between the bank, the mortgage form, and the request for the signing service by determining that the bank is an authorizing entity associated with the credential provided with the mortgage application form by the customer. The online signing service can also determine that the customer has not previously used the online signing service to sign the mortgage application form. The online signing service can allow the customer to electronically sign the mortgage application form based on determining that the bank is an authorizing entity associated with the credential and that the customer has not previously used the online signing service to sign the mortgage application form.

In accordance with some embodiments, a service provider identifies a shared service from multiple services provided by the server system. The service provider can include a server system and a service provider application executed at the server system. The shared service from the service provider can be specified by an authorizing entity, such as an entity associated with a subscription account for the online service. The service provider provides a credential associated with the shared service and the authorizing entity. In some embodiments, the service provider can generate the credential and instruct the authorizing entity to sign the credential. In other embodiments, the authorizing entity can provide a signed credential to the service provider contemporaneously with specifying a shared service to be provided to a requesting entity having the credential. The service provider receives a request from a requesting entity to access the shared service. The requesting entity is separate from the authorizing entity. In some embodiments, the identity of the requesting entity can be unknown to one or both of the authorizing entity and the service provider. The service provider verifies that the request includes the credential. Based on verifying that the request includes the credential, the service provider provides access to the shared service by the requesting entity.

As used herein, the term "service provider" is used to refer to one or more systems, one or more applications, and/or a combination thereof for providing electronic content to entities via a data network and/or performing one or more electronic services on behalf of entities via a data network. A service provider can be subscription-based, wherein the online service is accessible by entities identified by or otherwise associated with subscriber accounts. Non-limiting examples of service providers include online stores, applications facilitating online financial services, applications facilitating image processing services, applications facilitating banking services, applications facilitating legal services, etc.

As used herein, the term "shared service" is used to refer to one or more applications accessible via a service provider for obtaining, providing, or otherwise using electronic content via a data network and/or performing one or more electronic activities via a data network. In some embodiments, a shared service can be restricted to performing a obtaining, providing, or otherwise using a subset of the electronic content and/or performing a subset of the electronic activities that are provided by a given service provider. For example, a service provider that allows entities to electronically execute multiple types of documents may include multiples shared service, where each shared service is restricted to executing a respective type of document.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system, such as (but not limited to) performing an action in response to a request received by a service provider.

As used herein, the term "subscriber" is used to refer to a logical entity used in accessing a service provider and can refer to an account, device, or software application associated with one or more particular persons. For example, a subscriber may be identifiable by reference to an account used by an application to access an online service or other application. An account for a subscriber can also include one or more authentication credentials, such as a password, personal identification number, a security question and an associated answer, etc.

As used herein, the term "entity" is used to refer to an individual, organization, or other logical identity that can be uniquely identified by a service provider or other software application. An entity can be identified by reference to one or more subscriber accounts and/or by reference to a software identifier and/or hardware identifier associated with an application and/or device used to access an online service.

As used herein, the term "authorizing entity" is used to refer to an entity that can instruct a service provider to allow access by a third party to shared electronic content or a shared electronic service provided by the service provider. In some embodiments, the authorizing entity can be a subscriber to the service provider. For example, the authorizing entity may have established a subscriber account with the service provider prior to identifying shared electronic content or a shared electronic service accessible by a third party. Billing information for the authorizing entity can be included in the subscriber account. The service provider may charge the authorizing entity for access by the third party to shared electronic content or a shared electronic service by, for example, transmitting an invoice to the authorizing entity for use of a shared online service by the third party. The service provider can associate a credential with the authorizing entity and the shared online service to indicate that the authorizing entity has instructed the service provider to allow access to the shared online service.

As used herein, the term "credential" is used to refer to electronic data specifying that a requesting party providing the electronic data is authorized to access a shared online service provided by a service provider. The credential can include at least one attribute preventing repudiation of the credential by the authorizing entity. Prevention of repudiation of the credential by the authorizing entity can involve preventing the authorizing entity from challenging the validity of the credential used by the requesting party. A non-limiting example of a credential is a digital token such as (but not limited to) a digital certificate or other electronic data that is cryptographically signed via a private key associated with the authorizing entity.

In some embodiments, the authorizing entity can specify a limited number of uses of the shared service by the requesting entity and/or a maximum amount to be charged to the authorizing entity. In a non-limiting example, the shared service may be an online image processing service provider that provides multiple services. An authorizing entity can be a subscriber to the online image processing service, such as a wedding photography company. The authorizing entity and the provider of the shared service (e.g., the online image processing service provided via a server system) can execute a business agreement that one or more specific services are to be provided in response receiving a token signed by a specific authorization certificate. For example, a service identified in the business agreement may be a photo printing service. The authorizing entity can provide a public key to the image processing service that corresponds to the specific authorization certificate used to sign a token. A requesting entity, such as a client of the wedding photography company, can access a web site for the wedding photography company in order to print one or more photographs. The requesting entity can obtain a token from the web site that includes a type of request (e.g. "photo printing service"), parameter data (e.g., a customer identifier, a number of photographs, and one or more photograph sizes). The web site can sign the token with a private key corresponding to the authorization certificate used to sign the public key. The requesting entity (e.g., the client) can access the online image processing service. The requesting entity can provide the token obtained from the website to the online image processing service. The online image processing service can validate the token by checking the signature of the token using the public key provided by the authorizing entity. The online image processing service can perform the requested service identified by the token. For example, the online image processing service can access the web site for the wedding photography company and provide the token to the web site. The web site can provide one or more photographs to be printed based on validating the token. Providing the token from the online image processing service to the web site corresponding to the authorizing entity can prevent arbitrary requests being serviced for arbitrary customers (e.g, customers "spoofing" the token or other credential).

Referring now to the drawings, FIG. 1 is a block diagram depicting example computing systems for implementing certain embodiments. The example computing systems include a server system 102, an authorizing system 104, and a third party system 106 in communication via a data network 108.

The server system 102 includes a processor 110. Non-limiting examples of a processor 110 include a microprocessor, an application-specific integrated circuit ("ASIC"), a state machine, or other suitable processing device. The processor 110 can include any number of computer processing devices, including one. The processor 110 can be communicatively coupled to a computer-readable medium, such as a memory 112. The processor 110 can execute computer-executable program instructions and/or access information stored in the memory 112.

The memory 112 can store instructions that, when executed by the processor 110, cause the processor to perform operations described herein. The memory 112 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), floppy disk(s), CD-ROM, DVD, or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The server system 102 may also include a bus 114. The bus 114 can communicatively couple one or more components of the server system 102.

The server system 102 may also include a number of external or internal devices, such as input or output devices. For example, the server system 102 is shown with an input/output ("I/O") interface 116 for receiving input from input devices and/or providing output to output devices.

FIG. 1 also illustrates electronic content 118, a service provider application 120, and an authorizing server application 122 comprised in the memory 112 of the server system 102. The service provider application 120 can configure the processor 110 to provide electronic content 118 and/or provide one or more other services via the network 108 to one or more requesting entities that request the electronic content 118. The service provider application 120 can also configure the processor 110 to generate an invoice for an authorizing entity or other subscriber based on the service provider application 120 providing the electronic content 118 and/or other services. Non-limiting examples of a service provider application 120 include financial services software, document execution software, purchasing software, photo sharing software, etc. The authorizing server application 122 can configure the processor 110 to receive and process authorizations from an authorizing entity that can authorize a class of requesting entities to use the service provider application 120, as described in greater detail below.

An authorizing client application 128 can be executed or otherwise used at the authorizing system 104. The authorizing client application 128 can include one or more software modules for establishing communication with the authorizing server application 122 of the service provider application 120 and authorizing a third party or a class of third parties to access electronic content 118 and/or one or more other services. The authorizing client application 128 can be used to identify electronic content 118 and/or one or more other services provided by the service provider application 120 that can be accessed by a third party, as described in detail below. In some embodiments, the authorizing client application 128 can be a stand-alone application. In other embodiments, the authorizing client application 128 can be accessed via a portal or suitable process and/or interface via another application, such as a web browser application.

A requesting application 130 can be executed or otherwise used at the third party system 106. The requesting application 130 can include one or more software modules for establishing communication with the service provider application 120. In some embodiments, the requesting application 130 can be a stand-alone application. In other embodiments, the requesting application 130 can be accessed via a portal or suitable process and/or interface via another application, such as a web browser application.

The server system 102 can include any suitable computing system for hosting the service provider application 120. In one embodiment, the server system 102 may be a single computing system, such as a server system. In another embodiment, the server system 102 may be a virtual server implemented using a number of computing systems connected in a grid or cloud computing topology.

The authorizing system 104 can include any suitable computing system for providing the authorizing client application 128. The third party system 106 can include any suitable computing device or system for communicating via a data network 108 and executing the requesting application 130. Non-limiting examples of suitable computing devices or systems include a desktop computer, a tablet computer, a smart phone, or any other computing device or system suitable for using electronic content.

Figure 2:
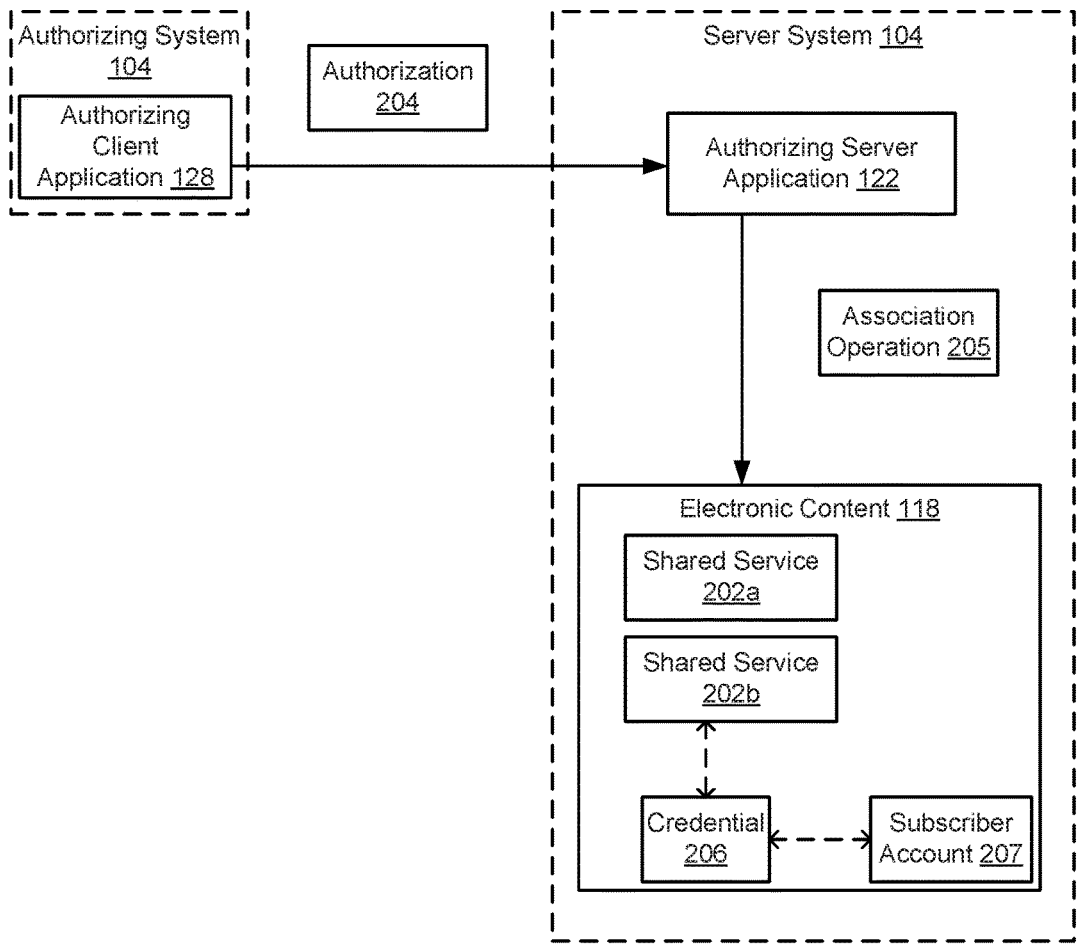
FIG. 2 is a modeling diagram depicting an example flow of communications for an authorizing entity authorizing a server system to provide access to a shared service.

FIG. 2 is a modeling diagram depicting an example flow of communications for an authorizing entity authorizing a server system to provide access to a shared service.

The server system 102 can provide electronic content 118 including shared services 202a, 202b. The shared services 202a, 202b can include software for providing electronic content to a requesting application 130 and/or performing another action in response to a request from a requesting application 130. In some embodiments, the shared service 202a, 202b can include services accessible by subscribers of the server system 102. Non-limiting examples of the shared services 202a, 202b include online stores, applications facilitating financial services, applications facilitating banking services, applications facilitating legal services, etc. Although FIG. 2 depicts the server system 102 as providing two shared services 202a, 202b, any number of shared services 202a, 202b (including one) can be provided by a server system 102.

The authorizing client application 128 can generate an authorization 204 specifying which of the shared services 202a, 202b is to be shared with a requesting entity on behalf of an authorizing entity. The authorizing client application 128 can provide the authorization 204 to the authorizing server application 122 via the data network 108. For example, the authorizing client application 128 can establish a data connection via the network 108 for accessing the authorizing server application 122. Establishing the data connection can also include the authorizing server application 122 transmitting authentication information for an authorizing entity's subscriber account 207 to the authorizing server application 122. Establishing the data connection can also include the authorizing server application 122 authenticating the authentication information for the authorizing entity.

The authorization 204 can include data transmitted from the authorizing client application 128 to the authorizing server application 122 via the data connection. The authorization 204 can identify one or more of the shared services 202a, 202b that a requesting application 130 providing an appropriate credential is permitted to access or otherwise use. For example, as depicted in FIG. 2, the authorization 204 can identify that the shared service 202b can be accessed by a requesting application 130 that provides a valid credential 206.

The authorizing server application 122 can associate the credential 206 with the shared service 202b and a subscriber account 207 via an association operation 205. An association operation 205 can store data in a memory 112 describing the association among the shared service 202b, the credential 206, and the subscriber account 207. The association between the credential 206 and the shared service 202b can cause the service provider application 120 to provide the shared service 202b in response to receiving a copy of the credential 206 from a requesting party, as described in further detail below. The subscriber account 207 can identify the authorizing entity and/or identify billing information associated with the authorizing entity. The association between the credential 206 and the shared service 202b can cause the authorizing server application 122 to generate an invoice addressed to the authorizing entity for a use of the shared service 202b associated with the credential 206.

The credential 206 can include any electronic data identifying that a requesting application 130 or any other requesting entity providing a copy of the credential 206 is authorized to access the shared service 202b. The credential 206 can include at least one attribute preventing repudiation of the credential 206 by the authorizing entity. A non-limiting example of a credential is a digital token such as (but not limited to) a digital certificate, a token encrypted via a keyed-hash message authentication code ("HMAC") process, or other electronic data that is cryptographically signed via a private key associated with the authorizing entity. In some embodiments, the credential 206 can be provided by the authorizing client application 128 to the authorizing server application 122 with the authorization 204. In other embodiments, the credential 206 can be generated by the authorizing server application 122 in response to receiving the authorization 204.

Generating the credential 206 can include applying one or more non-repudiation attributes to the credential 206. In one non-limiting example, applying one or more non-repudiation attributes to the credential 206 may be a process that includes transmitting the credential 206 from the authorizing server application 122 to the authorizing client application 128, digitally signing and/or encrypting the credential 206 by the authorizing client application 128, and transmitting the digitally signed and/or encrypted credential 206 from the authorizing client application 128 to the authorizing server application 122.

Figure 3:
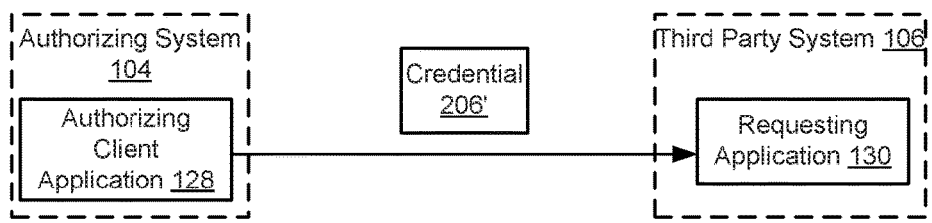
FIG. 3 is a modeling diagram depicting an example flow of communications for providing a credential from an authorizing entity to a requesting entity.

FIG. 3 is a modeling diagram depicting an example flow of communications for providing a credential 206' from an authorizing entity to a requesting entity. The credential 206' is a copy of the credential 206 associated with the shared service 202b. The authorizing client application 128 can provide the credential 206' to the requesting application 130 via the data network 108. Any suitable process can be used for communicating the credential 206' from an authorizing entity to a requesting entity. In one non-limiting example, the authorizing client application 128 can make the credential 206' available for download at a web site via the data network 108. In another non-limiting example, the authorizing client application 128 can transmit the credential 206' to the requesting application 130 via another application, such as an e-mail application.

Figure 4:
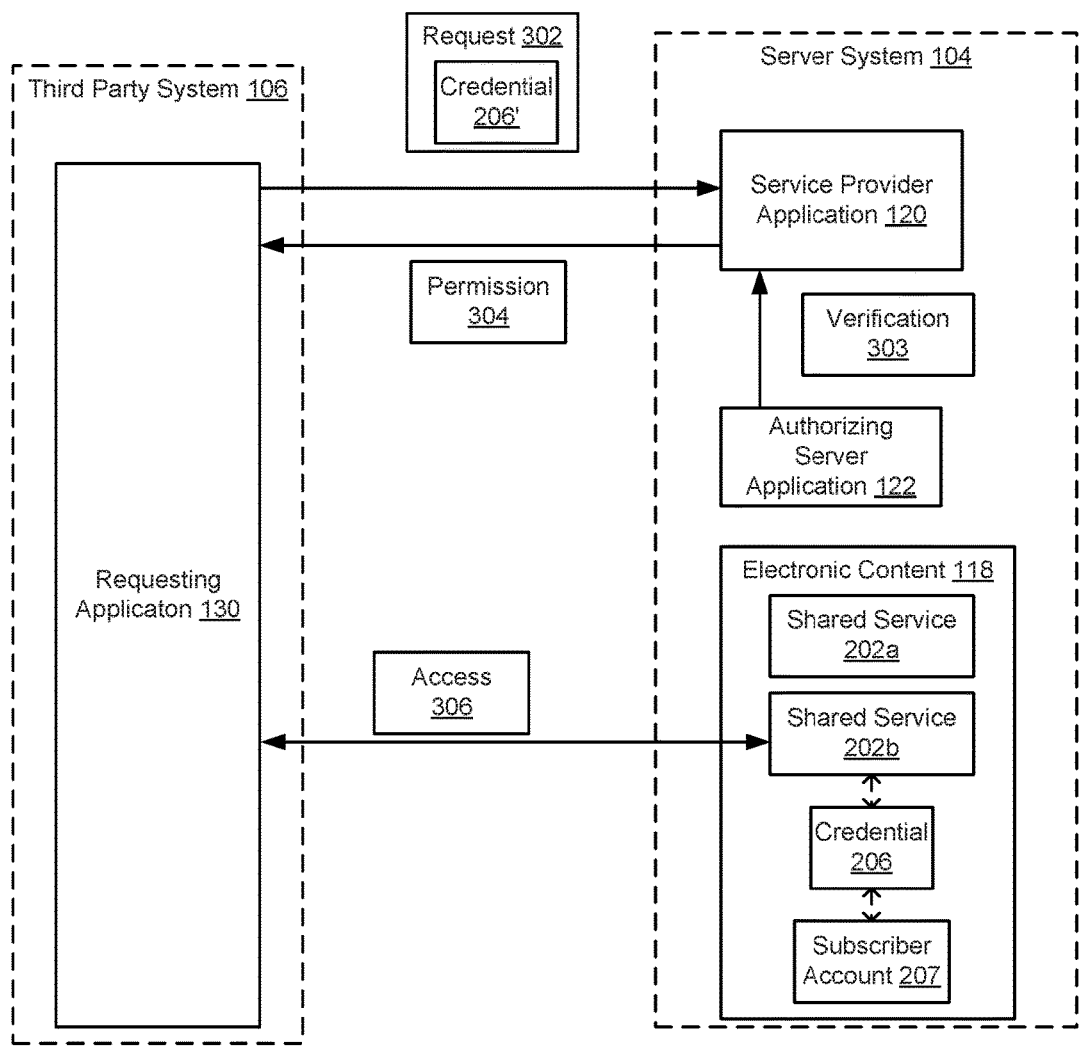
FIG. 4 is a modeling diagram depicting an example flow of communications for a server system providing access to a shared service based on receiving a credential from a requesting entity.

FIG. 4 is a modeling diagram depicting an example flow of communications for a server system 102 providing access to a shared service 202b based on receiving a credential 206' from a requesting entity. The requesting application 130 can provide a request 302 to the service provider application 120. The request 302 can include a credential 206' that is a copy of the credential 206 associated with the shared service 202b. The service provider application 120 can verify the validity of the credential 206' obtaining verification 303 from the authorizing server application 122. For example, the service provider application 120 can provide the credential 206' to the authorizing server application 122. The authorizing server application 122 can the credential 206' to the credential 206. The authorizing server application 122 can provide verification 303 to the service provider application 120. The service provider application 120 can provide permission 304 to the shared service 202b by the requesting application 130. The requesting application 130 can establish access 306 with the shared service 202b. The permission 304 can control the access 306 such that the requesting application 130 is restricted to accessing the shared service 202b.

In some embodiments, an authorization 204 may not specify the identity of the requesting entity using the shared service 202b, thereby allowing any entity providing the credential 206' to use the service. In a non-limiting example, the shared service 202b may be an online signing service and/or other application for electronically executing a document. Electronically executing a document can include performing one or more electronic activities that modify the document such that the modified document is legally binding. Non-limiting examples of electronically executing a document include adding an image of an individual's signature to the document, typing an individual's name into a signature field on the document, digitally signing the document using a token associated with an individual, etc. The online signing service can be used to digitally sign or otherwise execute electronic documents via an instance of the requesting application 130. The online signing service can be also be used to transmit executed electronic documents to a specified recipient, such as an authorizing client application 128 or other authorizing entity. A bank or other authorizing entity may execute the authorizing client application 128 to identify the online signing service via the authorization 204. The authorization 204 can specify one or more rules for using the online signing service. For example, the authorization 204 can specify that customers of the bank be permitted to use the online signing service. The authorization 204 can include or identify the source of a specific electronic document, such as a mortgage application. The authorization 204 can also specify that bank customers are restricted to using the online signing service to digitally execute mortgage applications and transmit the mortgage applications to the bank. The authorization 204 can also specify that each customer can use the online signing service for a single mortgage application. The service provider application 120 can receive, generate, or otherwise obtain a credential 206 for the mortgage application. The service provider application 120 can associate the credential 206 with the bank entity and with the online signing service.

A customer who wishes to apply for a mortgage may download the mortgage application form from the bank's website. The customer may also obtain a copy of the credential 206' from the bank's website. The customer may transmit a request 302 to execute the mortgage application form that includes the completed mortgage application form and the credential 206'. The service provider application 120 can verify the association between the bank entity and the online signing service by determining that the bank is an authorizing entity associated with the credential 206' provided in the request 302 with a mortgage application form.

The service provider application 120 can also determine that the customer has not previously used the online signing service to sign the mortgage application form. For example, the request 302 can include an identifier of the customer and the mortgage application form. The service provider application 120 can store a list of customers who have signed the mortgage application form in the memory 112. The service provider application 120 can verify that a given customer has not previously signed the mortgage application form by referencing the list of customers who have signed the mortgage application form. The service provider application 120 can provide permission 304 to the online signing service by allowing the customer to electronically execute the mortgage application form via the online signing service.

In another non-limiting example, the authorizing entity and the provider of the shared service (e.g., the online image processing service provided via a server system 102) can execute a business agreement that one or more specific services are to be provided in response to a credential 206', such as a token signed by a specific authorization certificate. For example, a service identified in the business agreement may be a photo printing service. The authorizing entity can provide a public key to the image processing service that corresponds to the specific authorization certificate used to sign a token. A requesting entity, such as a client of the wedding photography company, can access a web site for the wedding photography company in order to print one or more photographs. The requesting entity can obtain a token from the web site that includes a type of request (e.g. "photo printing service"), parameter data (e.g., a customer identifier, a number of photographs, and one or more photograph sizes). The web site can sign the token with a private key corresponding to the authorization certificate used to sign the public key. The requesting entity (e.g., the client) can access the online image processing service. The requesting entity can provide credential 206' (e.g., the token obtained from the website) to the service provider application 120 executed at a server system 102. The server system 102 can validate the token by checking the signature of the token using the public key provided by the authorizing entity. The server system 102 can performs the requested service identified by the token. For example, the server system can access the web site for the wedding photography company and provide the token to the website. The web site can provide one or more photographs to be printed based on validating the token. Providing the token from server system 102 to the web site corresponding to the authorizing entity can prevent arbitrary requests being serviced for arbitrary customers (e.g. customers "spoofing" the token or other credential 206').

In other embodiments, an authorization 204 may specify the identity of the requesting entity authorized to use the shared service 202b, thereby controlling the identity of entities permitted to use the shared service 202b on behalf of the authorizing entity. The authorizing entity and the provider of the shared service (e.g., the online image processing service provided via a server system 102) can execute a business agreement that one or more specific services are to be provided in response to a credential 206', such as a token signed by a specific authorization certificate. For example, a service identified in the business agreement may be a photo printing service. The authorizing entity can provide a public key to the image processing service that corresponds to the specific authorization certificate used to sign a token. A requesting entity, such as a client of the wedding photography company, can access a web site for the wedding photography company in order to print one or more photographs. The requesting entity can obtain a token from the web site that includes a type of request (e.g. "photo printing service"), parameter data (e.g., a customer identifier, a number of photographs, and one or more photograph sizes). The web site can sign the token with a private key corresponding to the authorization certificate used to sign the public key. The requesting entity (e.g., the client) can access the online image processing service. The requesting entity can provide credential 206' (e.g., the token obtained from the website) to the service provider application 120 executed at a server system 102. The server system 102 can validate the token by checking the signature of the token using the public key provided by the authorizing entity. The server system 102 can performs the requested service identified by the token. For example, the server system can access the web site for the wedding photography company and provide the token to the website. The web site can provide one or more photographs to be printed based on validating the token. Providing the token from server system 102 to the web site corresponding to the authorizing entity can prevent arbitrary requests being serviced for arbitrary customers (e.g, customers "spoofing" the token or other credential 206').

The service provider application 120 can generate a sample valid request 302 that the authorizing entity can distribute to one or more requesting parties. The service provider application 120 can associate the valid request 302 with the online image processing service or other shared service 202b. Associating the valid request 302 with the online image processing service or other shared service 202b can cause the service provider application 120 to provide permission 304 to the online image processing service or other shared service 202b in response to receiving a copy of the valid request 302. The valid request 302 can include a maximum number of allowed uses of the subscriber account and a credential 206' that is a secret key. In some embodiments, the request 302 can also include an identification of the requesting entity.

The service provider application 120 can provide a copy of a valid request 302 to the authorizing client application 128. The authorizing entity can provide a copy of the valid request 302 to one or more requesting entities via any suitable process. In some embodiments, the authorizing client application 128 can transmit the valid request 302 to the requesting application 130. In other embodiments, a separate application, such as (but not limited to) an e-mail application, can transmit the valid request 302 to the requesting entity as an e-mail attachment. In other embodiments, the authorizing entity can use a separate application, such as (but not limited to) an e-mail application, to transmit a location (such as a uniform resource locator or other network identifier) of the valid request 302 to the requesting entity.

The requesting entity can provide a copy of the valid request 302 to the service provider application 120. In some embodiments, the requesting entity can establish a subscriber account with the service provider application 120 to provide a copy of the valid request 302 to the service provider application 120. For example, the requesting entity can establish a subscriber account that allows the requesting entity to access the service provider application 120 and does not permit access to the image processing service or other shared service 202b. In some embodiments, the requesting entity can provide a copy of the valid request 302 to the service provider application 120 without establishing a subscriber account with the service provider application 120.

The service provider application 120 can process the request 302. Processing the request 302 can include verifying a secret key included in the credential 206' of the request 302. The secret key included in the credential 206' can be verified by any suitable process. A non-limiting example of a suitable verification process is a HMAC process. The service provider application 120 can provide access to the subscriber account of the authorizing entity in response to verifying that the request 302 has the credential 206', that the credential 206 is associated with a subscriber account (e.g., an account having billing information for an authorizing entity), and that the maximum number of allowed uses of the shared service 202b (e.g., the number of images processed by an online image processing service) is not exceeded.

The service provider application 120 can provide an invoice to the authorizing entity based on processing the request 302. In some embodiments, the service provider application 120 can provide an invoice to the authorizing entity in response to each of multiple requests 208 being processed. For example, an authorizing entity may be billed each time an online image processing service is used to process an image. In other embodiments, the service provider application 120 can provide an invoice to the authorizing entity in response to the maximum number of valid requests 208 being processed. For example, an authorizing entity may be billed after an online image processing service is used to process the maximum number of images specified in a valid request 302.

In additional or alternative embodiments, the service provider application 120 can notify the authorizing party that a maximum number of requests 208 have been received in response to receiving a request 302. For example, the service provider application 120 can transmit a notification via the authorizing client application 128 or via a separate application, such as an e-mail application or a text messaging application. The authorizing entity can respond to the notification by authorizing one or more additional uses of the shared service 202b via the authorizing client application 128. The service provider application 120 can allow access to the shared service 202b in response to the authorizing entity authorizing one or more additional uses of the shared service 202b.

Figure 5:
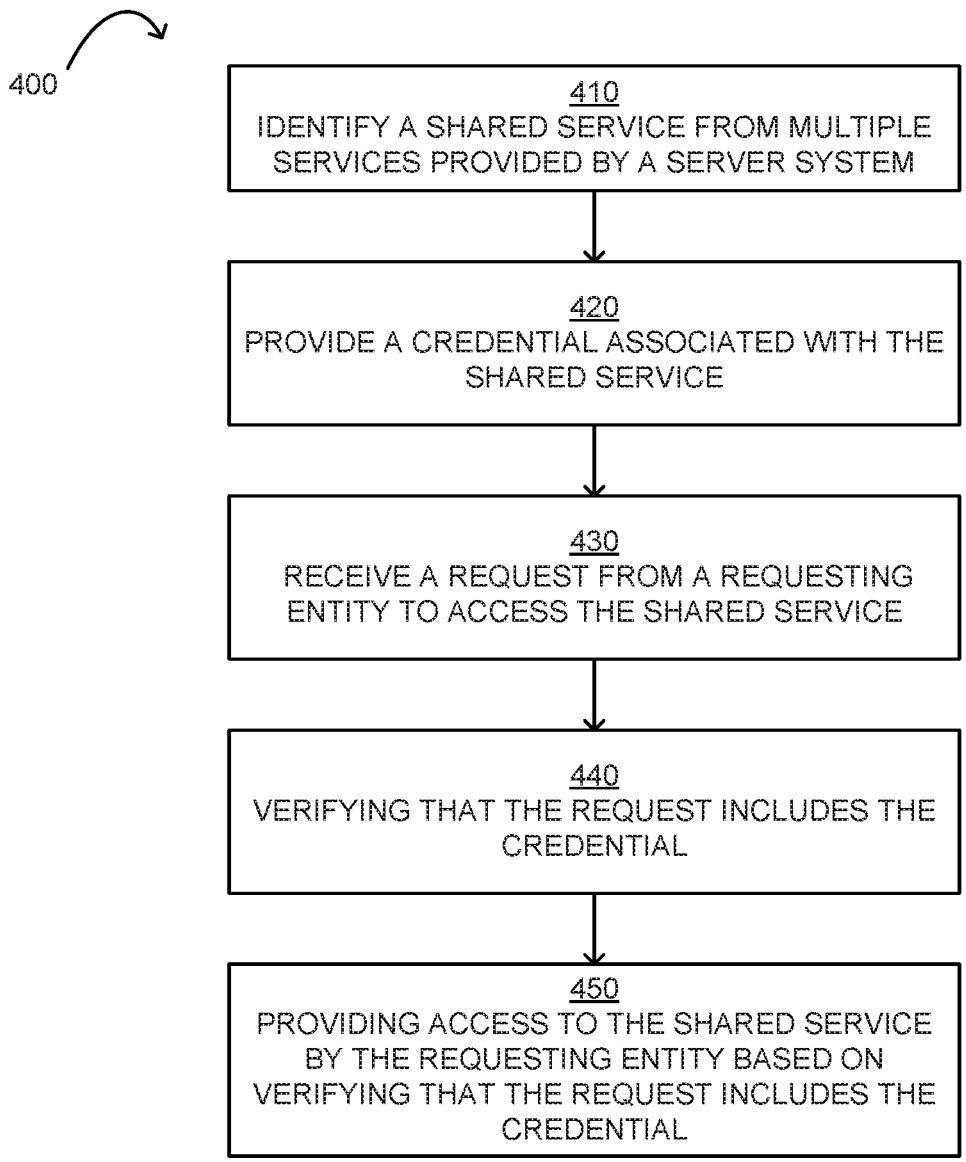
FIG. 5 is a flow chart illustrating an example method for authorizing access by a third party to a specific shared service from a service provider.

FIG. 5 is a flow chart illustrating an example method 400 for authorizing access by a third party to a specific shared service from a service provider. For illustrative purposes, the method 400 is described with reference to the system implementations depicted in FIG. 1 and the flow of communication depicted in FIG. 2. Other implementations, however, are possible.

The method 400 involves identifying a shared service from multiple services provided by a server system 102, as shown in block 410. For example, the processor 110 executing on the server system 102 can execute the authorizing server application 122 to identify a shared service 202b to be accessed by a requesting entity in response to a communication from an authorizing entity. For example, the shared service 202b can be identified based on an authorization 204 received from the authorizing client application 128, as described above with respect to FIG. 2. Non-limiting examples of a shared service include an online purchasing service, an online financial service, an online banking service, an online legal service, etc.

The method 400 further involves associating a credential with the shared service, as shown in block 420. For example, the processor 110 executing on the server system 102 can execute the authorizing server application 122 to provide the credential 206. For example, the authorizing server application 122 can store data in the memory 112 associating a shared service 202b, the credential 206, and a subscriber account 207. In some embodiments, the authorizing server application 122 can generate a credential 206 in response to receiving an authorization 204 from the authorizing entity via the authorizing client application 128. The authorizing server application 122 can create an association between the shared service 202b, the credential 206, and the subscriber account 207. In other embodiments, the authorizing server application 122 can provide a credential 206 received from the authorizing entity via the authorizing client application 128. Non-limiting examples of the credential include a digitally signed digital certificate, cryptographically signed electronic data, etc.

The method 400 further involves receiving a request 302 from a requesting entity to access the shared service 202b, as shown in block 430. For example, the processor 110 executing on the server system 102 can execute the service provider application 120 to receive the request 302 via a requesting application 130. The requesting entity can be an entity separate from the authorizing entity. In some embodiments, the request 302 may not include the identity of the requesting entity, thereby allowing any requesting entity to provide a request 302 for the shared service 202b.

The method 400 further involves verifying that the request 302 includes the credential 206', as shown in block 440. For example, the processor 110 executing on the server system 102 can execute the service provider application 120 to communicate with the authorizing server application 122 to verify that the request 302 includes the credential 206'. Verifying the request 302 can include verifying or otherwise determining that the credential 206' is associated with the shared service 202b and the authorizing entity. The credential 206' can be verified via any suitable process. A non-limiting example of a suitable verification process is a HMAC process.

The method 400 further involves providing access to the shared service 202b by the requesting entity based on verifying that the request 302 includes the credential 206', as shown in block 450. For example, the processor 110 executing on the server system 102 can execute the service provider application 120 to provide access to the shared service 202b, as described above with respect to FIG. 2. Providing access to the shared service 202b can include restricting the requesting entity to accessing the shared service 202b identified by the credential 206' as authorized by the authorizing entity. For example, a service provider may offer multiple services and a requesting entity may be restricted to a subset of the multiple services based on an authorization specified by the credential 206'.

In additional or alternative embodiments, the service provider application 120 can verify one or more attributes of the request 302 in addition to the presence of a valid credential 206'. For example, the authorizing entity may specify a maximum number of uses of the shared service 202b. The service provider application 120 can track the number of requests 208 for the shared service 202b processed by the service provider application 120. In response to receiving each new request 302, the service provider application 120 can verify that the tracked number of requests 208 does not exceed a maximum number of uses. The service provider application 120 can provide access to the shared service 202b based on the tracked number of requests 208 being less than a maximum number of uses. The service provider application 120 can increment the tracked number of requests 208 in response to a given request 302 resulting in a provision of the shared service 202b to a requesting party. In some embodiments, the service provider application 120 can deny access to the shared service 202b based on the tracked number of requests 208 being greater than or equal to a maximum number of uses. In other embodiments, the service provider application 120 can provide a notification to the authorizing entity based on the tracked number of requests 208 being greater than or equal to a maximum number of uses. The service provider application 120 can solicit permission from the authorizing entity to permit additional uses of the shared service 202b in excess of the maximum number of uses. The service provider application 120 can deny access to the shared service 202b in response to the authorizing entity denying the processing of excess requests. The service provider application 120 can allow access to the shared service 202b in response to the authorizing entity permitting the processing of excess requests.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   determining, based on communications between a service provider application executed on a server system and an authorizing device associated with an authorizing entity, that a shared service from a plurality of services managed by the service provider application has been specified by the authorizing entity, wherein the shared service and the plurality of services are accessible by end-user devices via a data network, wherein the authorizing entity is subscribed to the shared service, wherein the authorizing entity comprises an entity (i) having a subscription account with the service provider application and (ii) that accesses the service provider application by providing authentication information that matches subscriber information in the subscription account, wherein the subscription account include contact information for the authorizing entity;
   creating, by the service provider application, (i) a credential and (ii) association data indicating an association among the credential, the authorizing entity, and the shared service that is specified by the authorizing entity;
   transmitting the credential from the service provider application to the authorizing device;
   receiving, via additional communications between the service provider application and a third-party device associated with a requesting entity, a request for the requesting entity to access the shared service, wherein the requesting entity is separate from the authorizing entity and is not subscribed to the shared service;
   verifying, by the service provider application, that (i) the request includes the credential and (ii) the association exists among the credential received in the request, the shared service, and the authorizing entity;
   providing, by the service provider application and based on verifying that the request includes the credential and that the association exists, the requesting entity with access to the shared service, wherein the requesting entity is restricted to accessing specific types of transactions of the shared service based on an authorization that is (i) specified by the authorizing entity and (ii) identified by the credential as authorized by the authorizing entity; and
   performing, by the service provider application and responsive to providing access to the shared service to the requesting entity, operations comprising:
      generating an invoice for use of the shared service by the third-party device using the credential, and
      transmitting, to the contact information from the subscription account, the invoice for use of the shared service,
   wherein the determining, the creating, the receiving of the request, the verifying, and the providing of the access are executed by a processing device of the server system.

2. The method of claim 1, wherein the credential comprises a digital token having at least one attribute preventing repudiation of the credential.

3. The method of claim 2, wherein the digital token comprises a digital certificate.

4. The method of claim 2, wherein the digital token comprises electronic data that is cryptographically signed (i) by the authorizing entity and (ii) with a private key, wherein the method further comprises:
   obtaining, by the service provider application and via communications with the authorizing device, a public key corresponding to the private key; and
   verifying, by the service provider application and with the public key, that the credential, as received from the third-party device, has been cryptographically signed with the private key, wherein the requesting entity is provided with access to the shared service based on the service provider application performing the verification with the public key.

5. The method of claim 1, further comprising performing, by the service provider application, additional operations comprising:
   determining that a cost associated with the shared service exceeds a threshold cost;
   based on determining that the cost exceeds the threshold cost, notifying the authorizing entity that the requesting entity has requested access to the shared service.

6. The method of claim 1, wherein the specific types of transactions of the shared service comprise an electronic execution of a document and wherein the request comprises the document to be executed.

7. The method of claim 1, wherein the method further comprises permitting the authorizing entity to access the service provider application based on matching the authentication information received from the authorizing device to the subscriber information in the subscription account, wherein the subscription account indicates that the authorizing entity is subscribed to the shared service,
   wherein the credential (i) lacks an identification of the requesting entity and (ii) permits access to the service provider application without the requesting entity having subscription accounts for any of the plurality of services.

8. A non-transitory computer-readable medium tangibly embodying program code of a service provider application that is executable by a processor of a server system, the program code comprising:
   program code for determining, based on communications between the service provider application and an authorizing device associated with an authorizing entity, that a shared service from a plurality of services managed by the service provider application has been specified by the authorizing entity, wherein the shared service and the plurality of services are accessible by end-user devices via a data network, wherein the authorizing entity is subscribed to the shared service, wherein the authorizing entity comprises an entity (i) having a subscription account with the service provider application and (ii) that accesses the service provider application by providing authentication information that matches subscriber information in the subscription account, wherein the subscription account include contact information for the authorizing entity;

program code for creating, by the service provider application, (i) a credential and (ii) association data indicating an association among the credential, the authorizing entity, and the shared service that is specified by the authorizing entity;

program code for transmitting the credential from the service provider application to the authorizing device;

program code for receiving, via additional communications between the service provider application and a third-party device associated with a requesting entity, a request for the requesting entity to access the shared service, wherein the requesting entity is separate from the authorizing entity and is not subscribed to the shared service;

program code for verifying, by the service provider application, that (i) the request includes the credential and (ii) the association exists among the credential received in the request, the shared service, and the authorizing entity;

program code for providing, by the service provider application and based on verifying that the request includes the credential and that the association exists, the requesting entity with access to the shared service, wherein the requesting entity is restricted to accessing specific types of transactions of the shared service based on an authorization that is (i) specified by the authorizing entity and (ii) identified by the credential as authorized by the authorizing entity; and program code for performing, responsive to providing access to the shared service to the requesting entity, operations comprising:
generating an invoice for use of the shared service by the third-party device using the credential, and
transmitting, to the contact information from the subscription account, the invoice for use of the shared service.

9. The non-transitory computer-readable medium of claim 8, wherein the credential comprises a digital token having at least one attribute preventing repudiation of the credential.

10. The non-transitory computer-readable medium of claim 9, wherein the digital token comprises a digital certificate.

11. The non-transitory computer-readable medium of claim 9, wherein the digital token comprises electronic data that is cryptographically signed (i) by the authorizing entity and (ii) with a private key, wherein the program code further comprises:
program code for obtaining, by the service provider application and via communications with the authorizing device, a public key corresponding to the private key; and
program code for verifying, by the service provider application and with the public key, that the credential, as received from the third-party device, has been cryptographically signed with the private key, wherein the requesting entity is provided with access to the shared service based on the service provider application performing the verification with the public key.

12. The non-transitory computer-readable medium of claim 8, wherein the specific types of transactions of the shared service comprise an electronic execution of a document and wherein the request comprises the document to be executed.

13. A server system comprising:
a processor; and
a non-transitory computer-readable medium communicatively coupled to the processor;

wherein the processor is configured to execute a service provider application comprising program instructions embodied in the non-transitory computer-readable medium and to thereby perform operations comprising:
determining, based on communications between the service provider application and an authorizing device associated with an authorizing entity, that a shared service from a plurality of services managed by the service provider application has been specified by the authorizing entity, wherein the shared service and the plurality of services are accessible by end-user devices via a data network, wherein the authorizing entity is subscribed to the shared service, wherein the authorizing entity comprises an entity (i) having a subscription account with the service provider application and (ii) that accesses the service provider application by providing authentication information that matches subscriber information in the subscription account, wherein the subscription account include contact information for the authorizing entity, creating (i) a credential and (ii) association data indicating an association among the credential, the authorizing entity, and the shared service that is specified by the authorizing entity, transmitting the credential from the service provider application to the authorizing device, receiving, via additional communications between the service provider application and a third-party device associated with a requesting entity, a request for the requesting entity to access the shared service, wherein the requesting entity is separate from the authorizing entity and is not subscribed to the shared service, verifying that (i) the request includes the credential and (ii) the association exists among the credential received in the request, the shared service, and the authorizing entity, providing the requesting entity with access to the shared service based on verifying that the request includes the credential and that the association exists, wherein the requesting entity is restricted to accessing specific types of transactions of the shared service based on an authorization that is (i) specified by the authorizing entity and (ii) identified by the credential as authorized by the authorizing entity, and performing, responsive to providing access to the shared service to the requesting entity, additional operations comprising:
generating an invoice for use of the shared service by the third-party device using the credential, and
transmitting, to the contact information from the subscription account, the invoice for use of the shared service.

14. The server system of claim 13, wherein the credential comprises a digital token having at least one attribute preventing repudiation of the credential.

15. The server system of claim 14, wherein the digital token comprises a digital certificate.

16. The server system of claim 14, wherein the digital token comprises electronic data that is cryptographically signed (i) by the authorizing entity and (ii) with a private key, wherein the operations further comprise:
obtaining, via communications with the authorizing device, a public key corresponding to the private key; and verifying, with the public key, that the credential, as received from the third-party device, has been cryptographically signed with the private key, wherein the requesting entity is provided with access to the shared service based on the service provider application performing the verification with the public key.

17. The server system of claim 14, the operations further comprising:
   determining that a cost associated with the shared service exceeds a threshold cost;
   based on determining that the cost exceeds the threshold cost, notifying the authorizing entity that the requesting entity has requested access to the shared service.

18. The server system of claim 13, wherein the operations further comprise permitting the authorizing entity to access the service provider application by matching the authentication information received from the authorizing device to the subscriber information in the subscription account, wherein the subscription account indicates that the authorizing entity is subscribed to the shared service,
   wherein the credential (i) lacks an identification of the requesting entity and (ii) permits access to the service provider application without the requesting entity having subscription accounts for any of the plurality of services.

* * * * *